Feb. 21, 1939.  A. D. EDGINGTON  2,148,370
ROD WEEDER CHAIN TIGHTENER
Filed Nov. 1, 1938  2 Sheets-Sheet 1

INVENTOR
AARON D. EDGINGTON
BY O. W. Lee
ATTORNEY

Feb. 21, 1939. A. D. EDGINGTON 2,148,370
ROD WEEDER CHAIN TIGHTENER
Filed Nov. 1, 1938  2 Sheets-Sheet 2
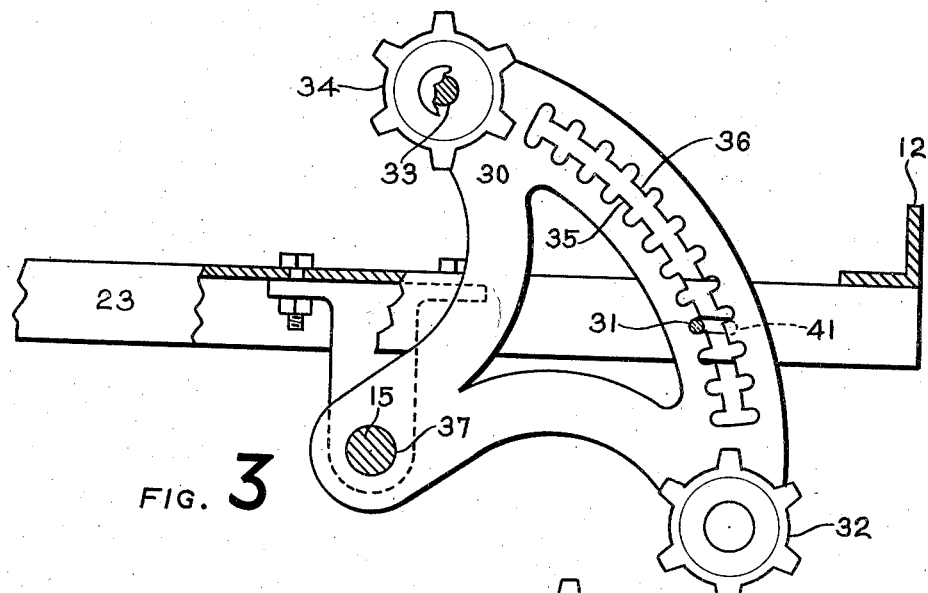
FIG. 3
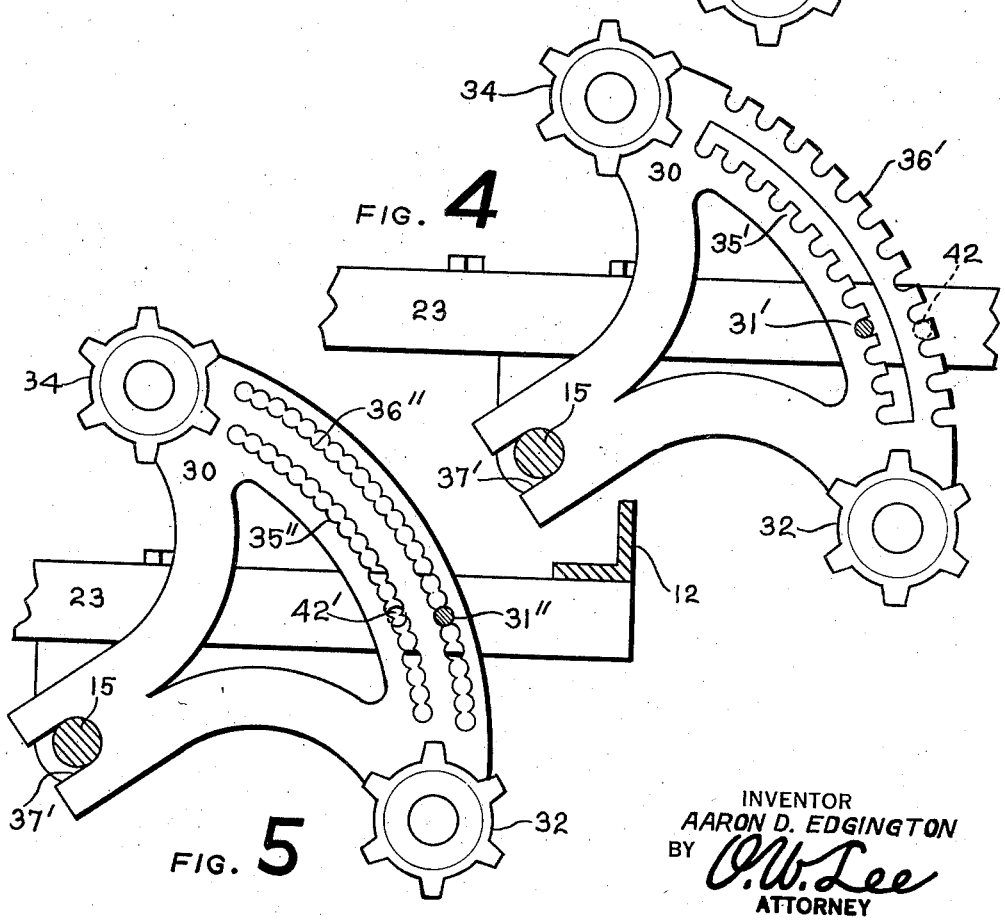
FIG. 4
FIG. 5
INVENTOR
AARON D. EDGINGTON
BY O.W. Lee
ATTORNEY Patented Feb. 21, 1939

2,148,370

UNITED STATES PATENT OFFICE 2,148,370

ROD WEEDER CHAIN TIGHTENER

Aaron D. Edgington, Cheney, Wash., assignor to Cheney Weeder Company, Cheney, Wash., a corporation of Washington Application November 1, 1938, Serial No. 238,180

10 Claims. (Cl. 74—242.10)

The present invention relates to an improved rod weeder chain tightener particularly adapted for use with rotary rod weeders driven by a sprocket chain, wherein the working flight of the sprocket chain is led from the underside of the driven sprocket and then engaged with the upper portion of the drive sprocket, and the return flight then led back above the working flight and trained over the top of the driven sprocket and therearound.

This particular arrangement of sprocket chain drive has come into general use for driving the rotary rod in a direction opposite to the turning of the supporting wheels of the weeder, which reverse rotation of the rotary rod is essential to efficient operation.

In such sprocket chain drives it is essentially necessary to provide some means to take up slack in the sprocket chain. Various means have been employed to take up such slack as can not be eliminated by removing one or more links. However, there exists a demand for a chain tightener which will afford a greater range of take-up and afford more selective regulation than is afforded by the prior art devices.

Spring urged sprocket chain tighteners have the disadvantage that when the weeder is backed up, then the return flight of the sprocket chain becomes the working flight and the spring urged tightener is then urged down and its purpose defeated so that the sprocket chain will leave one or more of the sprockets and cause difficulty. Occasional backing up of the weeder is necessary, and it is particularly desirable that the action of the sprocket chain tightener should be positive and constant no matter in which direction the machine is moved.

The present invention provides a simple and efficient chain tightening device which will positively and constantly hold the sprocket chain at any desired tightness no matter whether the weeder is moved forwards or backwards. The improved device is journaled on the shaft of the drive sprocket and movable therearound over a wide range fully adequate for the required purposes. It is held in any required position by a single bolt which is selectively engaged with alternate racks which provides exceptional accuracy of take-up, and positive locking so as to preclude slippage during operation of the weeder.

The wide range of take-up afforded by the present invention makes it possible to employ several extra links in the sprocket chain, and then when any link breaks during use, it is unnecessary to replace it; but rather, such broken links are removed and discharged and the chain tightening device altered according to the number of links removed.

The invention provides an idler wheel and a take-up wheel in close proximity to the drive sprocket and movable therearound at a constant distance from the axis of the drive sprocket so as to afford a liberal take-up and also require but a minimum of space, and also to assure that the sprocket chain will adequately embrace the drive sprocket over sufficient area to properly distribute the pull and cause the sprocket chain to cling to the drive sprocket instead of climbing the teeth thereof, as will sometimes occur when there is not sufficient embrace.

The device is so constructed and mounted that its own weight serves as an index for tightening the sprocket chain, and its use and operation is extremely simple, and convenient.

The invention can readily be installed in any rotary rod weeder having the hereinbefore described type of sprocket chain drive, and it effects a material saving of time and expense in assembly and disassembly, as well as affording a highly efficient and accurate means of chain tightening. The invention is equally serviceable in any other type of machine where the disclosed construction will suffice for the required purposes.

The accompanying drawings illustrate the nature and principle of the invention.

Fig. 3 shows the invention in side elevation as it appears after removing the drive sprocket and sprocket chain; and discloses opposed racks.

Fig. 4 shows a side elevation of the invention with both racks positioned in the same direction.

Fig. 5 shows a side elevation of the invention, in the form in which it is now commercially marketed.

It is common practice to make rotary rod weeders with either center drive, or else end drive. Sprocket chain drive is equally serviceable in either of these types of drives. In the well known end drive type, the end of the rotary rod is connected to a tumbler shaft by a universal joint and this tumbler shaft is turned by a driven sprocket at one end of the machine. In the well known center drive type, the driven sprocket is located near the center of the machine and used to turn a secondary sprocket chain connected to the center of the rotary rod. The drive sprocket is located according to the type of drive, and in either instance the present invention is installed adjacent to the drive sprocket.

Figure 2:
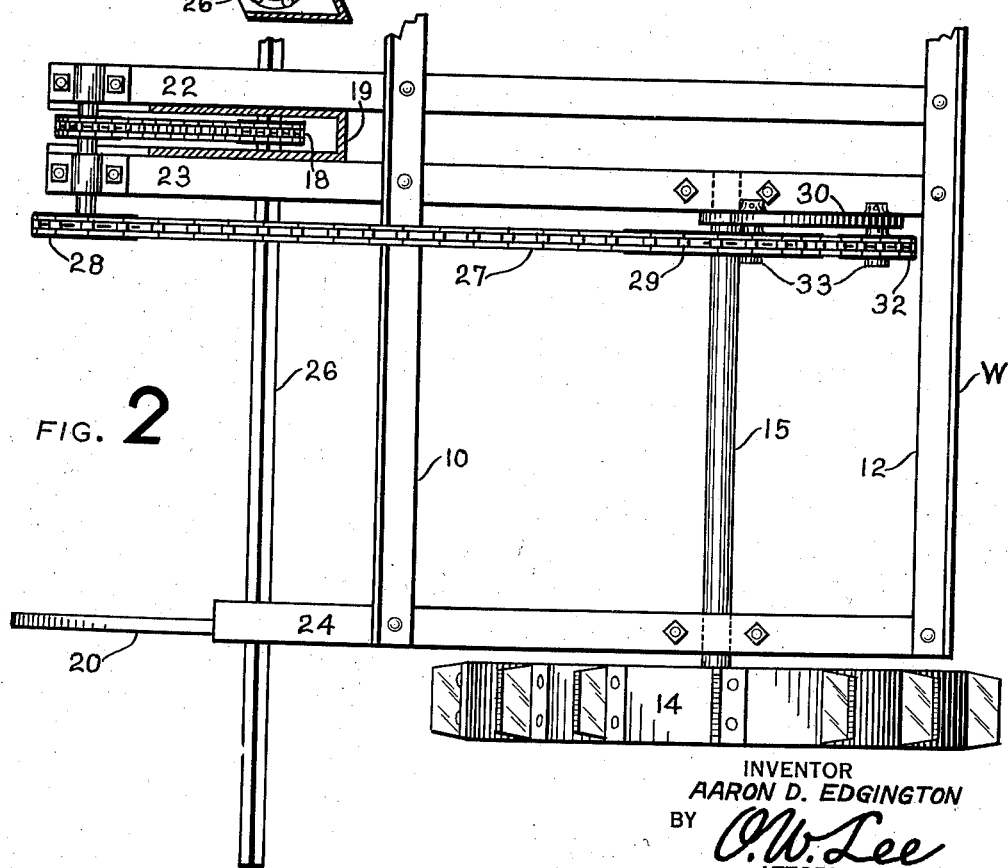
Fig. 2 is a plan view of a rotary rod weeder embodying the present invention.

Figure 2 shows a plan view of the well known type of center drive wherein the frame W consists of a front rail 12 and a back rail 10 connected together by rearwardly extending frame members such as 22, 23 and 24 to which are rigidly secured a suitable number of earth penetrating standards such as 19 and 20 in which the rotary rod 26 is journaled. This frame W is rockably supported upon the axles of a pair of carriage wheels one of which is utilized as a drive wheel. As shown in Fig. 2 the drive wheel 14 is fixed to the axle 15 which extends to the center of the machine and is journaled in a suitable bearing attached to the frame member 23, the outer end being journaled in a bearing attached to the frame member 24.

A drive sprocket 29 is fixed to the axle 15 so as to turn with the drive wheel 14. A driven sprocket 28 is fixed to a shaft which is suitably journaled on the frame members 23 and 22 and a secondary sprocket drive 18 extends down through the hollow standard 19 and is operatively connected to the rotary rod 26, as will be clear from an inspection of Fig. 1 and Fig. 2 which illustrate the usual practice.

Figure 1:
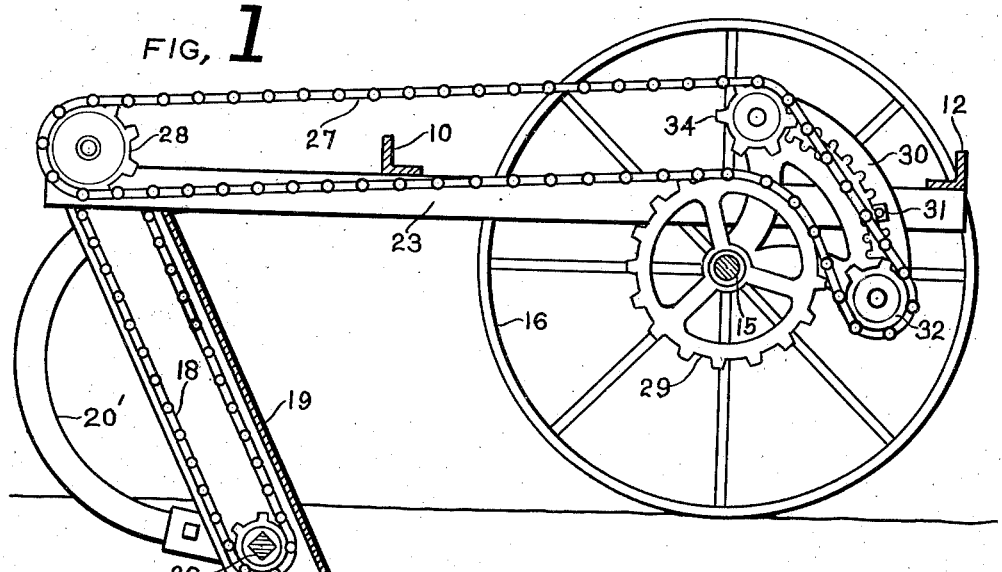
Fig. 1 is a vertical section of a rotary rod weeder embodying the present invention.

When the present invention is installed in this well known type of drive, a sector 30 is positioned between the drive sprocket 29 and the frame member 23 as indicated in Fig. 2. This sector 30 is journaled on the axle 15 and locked to the frame member 23 by means of a bolt and nut 31 as shown in Fig. 1.

As best seen in Fig. 3, a take-up sprocket 32 and an idler sprocket 34 are journaled on the sector 30 in triangular arrangement with the journal bearing 37 for the axle 15. In the present instance these sprockets are journaled on headed stub shafts 33 fixed in bosses in the sector 30, but any suitable means may be used for mounting these sprockets. Also, these sprockets may be supplanted by flanged pulleys serving a like purpose.

As best seen in Fig. 3, the sector 30 is provided with two arcuate racks 35 and 36 concentric with the journal bearing 37, and it will be clear that the bolt 31 can be employed to lock either of these racks to the frame member 23. As here shown, the racks face each other, and are sufficiently spaced apart so that when the bolt 31 is moved to the center of the slot 41, both racks will then be free of the bolt and the sector can then be moved around the axle 15, to provide for engaging the bolt with any portion of either one of the two racks 35 and 36.

As shown in Fig. 3, the rack 36 will engage the bolt 31 at positions intermediate those afforded by the rack 35. In this manner it is possible to lock the sector step by step in positions varying an amount equal to the diameter of the bolt 31, which would be practically impossible with a single rack.

As shown in Fig. 1, a sprocket chain 27 leads from the underside of the driven sprocket 28 and engages with the upper portion of the drive sprocket 29 and is then trained around the take-up sprocket 32 and returned back over the idler sprocket 34 to the top of the driven sprocket 28 and therearound. This provides the reverse drive which is essential to efficient operation of a rotary rod weeder.

As will be apparent from Fig. 1, the take-up sprocket 32 and the idler sprocket 34 can be swung around the axis of the drive sprocket 29 so as to accommodate considerable variation in the length of the sprocket chain 27. As for instance, a number of extra links could be added to the showing in Fig. 1 and the sector 30 swung downward until the bolt 31 engages near the top of one of the racks 35 or 36; then when one or more links break in use, it would be a simple matter to remove the broken links and raise the sector 30 the required amount to afford the proper tension on the sprocket chain 27; and the removal of links could be repeated throughout the entire range of the racks 35 and 36 before the sprocket chain became too short for service.

This wide range of take-up is of advantage in the operation of a machine of this kind where occasional breakage of the sprocket chain is to be expected. It is also important that the sprocket chain have a minimum of slack, for otherwise the hard use in uneven ground would cause objectionable slapping of the sprocket chain. Also, too tight a sprocket chain causes unnecessary wear. With the present invention it is a simple matter to merely disengage the bolt 31, and then the weight of the sector 30 and the parts carried thereby will take up whatever slack may happen to exist in the sprocket chain 27, whereupon the bolt 31 can then be engaged with whichever part of either of the racks that is then in register with the slot 41, and a nut used to hold the bolt engaged with the rack during operation. The invention provides a quick and easy means to repeatedly take up small amounts of slack which naturally occur from wear, and eliminates the disadvantage which would otherwise result from constantly increasing slack due to wear. The sector 30 is firmly held in positive relationship, and constant tension is maintained upon the sprocket chain 27, no matter whether the machine is moved forwards or backwards.

Figure 4 shows the two racks facing in the same outward direction, in which instance, the bolt 31' can be moved from its illustrated position to a second hole 42 in the frame member 23, or these two holes may be united to form a single slot. As there shown, the bearing 37' may be an open fork, instead of the round bore 37 shown in Fig. 3.

Figure 5 shows the invention in the form in which it is now being commercially marketed. This form provides for the sector 30 to be moved step by step an amount equal to less than half the diameter of the bolt 31'' which is highly desirable in actual practice. The rack 35'' has teeth which are nearer together than the diameter of the bolt 31''; and the rack 36'' has similar teeth which engage the bolt 31'' at positions intermediate those afforded by the rack 35''. These racks are formed by a series of overlapping bores, and the opposite wall of each bore serves to provide adequate engagement for the bolt 31'' so as to preclude slippage.

In the well known end drive type of rotary rod weeder, the drive sprocket is usually placed adjacent the drive wheel; in which case, the sector 30 is mounted adjacent the drive sprocket and journaled on the axle of the drive wheel, no matter whether the axle is turned, or the drive wheel and drive sprocket turned upon a stationary axle as is sometimes the case.

The invention can be provided as original equipment in new machines, and can also be quickly and easily installed in machines already in use.

In the present disclosure, I claim as my invention:—

1. In a weeder embodying a frame supported upon the axles of a pair of wheels and a rotary rod carried by the frame and operatively connected with a driven sprocket; a drive sprocket turned by one of said wheels, a sector journaled coaxially with said drive sprocket, an idler wheel and a take-up wheel journaled upon said sector and in the plane of said drive sprocket, the idler wheel being above the drive sprocket and the take-up wheel being forwardly of the drive sprocket, a sprocket chain leading from the underside of the driven sprocket and engaged with the upper portion of the drive sprocket and then trained backwards around said take-up wheel and engaged over said idler wheel and returned over and around the driven sprocket, two arcuate racks upon said sector, and a bolt passed through a portion of the frame and alternately engageable with said racks to selectively hold said sector in fixed relation with the frame, said racks having such relation to each other that said bolt holds one rack at rotative positions intermediate those afforded by engaging said bolt with the other rack.

2. In a weeder embodying a frame supported on the axles of a pair of wheels and a rotary rod carried by the frame and operatively connected with a driven sprocket; a drive sprocket on one of said axles and turned by the wheel thereon, a sector journaled on that axle, an idler wheel and a take-up wheel journaled on said sector and in triangular arrangement with said drive sprocket, a sprocket chain leading from the underside of the driven sprocket and engaged with the upper portion of said drive sprocket and then trained backwards around said take-up wheel and engaged over said idler wheel and returned over and around the driven sprocket, an arcuate rack upon said sector, a detent passing through a portion of said frame and selectively engageable with said rack, a second arcuate rack upon said sector and alternately engageable by said detent, said racks having such relation to each other that said detent holds one rack at rotative positions intermediate those afforded by engaging said detent with the other rack.

3. In a weeder embodying a frame supported on the axles of a pair of wheels and a rotary rod carried by the frame and operatively connected with a driven sprocket; a drive sprocket on one of said axles and turned by the wheel thereon, a sector journaled on that axle, an idler wheel and a take-up wheel journaled on said sector and in triangular arrangement with said drive sprocket, a sprocket chain leading from the underside of the driven sprocket and engaged with the upper portion of said drive sprocket and then trained backwards around said take-up wheel and engaged over said idler wheel and returned over and around the driven sprocket, and an arcuate locking means for holding said sector rigid with said frame at various positions of rotation.

4. In a rotary rod weeder having a driven sprocket and a drive sprocket and a sprocket chain leading from the underside of the driven sprocket and engaged with the upper portion of the drive sprocket and then returned above the drive sprocket and trained over the top of the driven sprocket and therearound; a sector journaled coaxially with the drive sprocket, an idler wheel and a take-up wheel journaled upon said sector and supporting the sprocket chain, an arcuate rack upon said sector, and a detent for selectively engaging said rack and holding said sector in fixed position.

5. In a rotary rod weeder, a sprocket chain tightener comprising a sector, a journal bearing on said sector, an idler wheel and a take-up wheel journaled upon said sector and in triangular arrangement with said journal bearing, two arcuate racks concentric with said journal bearing, and a detent selectively engagable with said racks alternately.

6. In a rotary rod weeder having a sprocket wheel fixed upon a journaled shaft; a sector journaled on said shaft, an idler wheel and a take-up wheel journaled on said sector and in triangular arrangement with said sprocket wheel, an arcuate series of locking means upon said sector, and a second arcuate series of locking means upon said sector for selectively holding the same in rotative positions intermediate those afforded by the other said series.

7. In a rotary rod weeder having a sprocket wheel fixed upon a journaled shaft; a sector journaled on said shaft, an idler wheel and a take-up wheel journaled on said sector and in triangular arrangement with said sprocket wheel, and an arcuate locking means for selectively holding said sector in fixed position.

8. A sprocket chain tightener comprising a sector, a journal bearing on said sector, an idler wheel and a take-up wheel journaled upon said sector and in triangular arrangement with said journal bearing, and two arcuate series of locking means concentric with said journal bearing.

9. A sprocket chain tightener comprising a sector, a journal bearing on said sector, an idler wheel and a take-up wheel journaled upon said sector and in triangular arrangement with said journal bearing, and an arcuate series of locking means concentric with said journal bearing.

10. A sprocket chain tightener comprising a sector, a journal bearing upon said sector, an idler wheel and a take-up wheel journaled upon said sector and in triangular arrangement with said journal bearing, and an arcuate locking means for selectively holding said sector in fixed relation with a support.

AARON D. EDGINGTON.